United States Patent Office 3,068,127
Patented Dec. 11, 1962

3,068,127

METHOD OF PRODUCING A HIGHLY DOPED p-TYPE ZONE AND AN APPERTAINING CONTACT ON A SEMICONDUCTOR CRYSTAL

Hubert Patalong and Adolf Herlet, Pretzfeld, Germany, assignors to Siemens-Schuckertwerke Aktiengesellschaft, Berlin-Siemensstadt, Germany, a corporation of Germany No Drawing. Filed June 2, 1959, Ser. No. 817,456
7 Claims. (Cl. 148—1.5)

Our invention relates to a method for producing a highly doped p-type zone and an appertaining contact electrode on a monocrystalline semiconductor body of silicon by alloying a metal or metal alloy into a surface zone of the silicon.

A method of this kind is disclosed and claimed in the co-pending application of R. Emeis, Serial No. 790,877, filed February 3, 1959, now Patent No. 3,009,840, for Method of Producing a Semiconductor Device of the Junction Type, assigned to the assignee of the present invention. According to that method, solid boron is added to the silicon alloy when the latter is in the liquid state. Preferably, the boron is first applied in amorphous form to gold which is then rolled to a foil, and the foil is thereafter alloyed into one of the flat sides of a silicon disk by application of heat and mechanical pressure. The boron may also be added in form of a compound, for example as boric acid, or may be sprinkled as a loose powder upon the gold foil prior to commencing the alloying process.

The use of boron as an acceptor substance to obtain p-type conductance of silicon permits attaining a higher doping concentration than when using aluminum, because boron has a greater solubility in the re-solidifying silicon, the distribution coefficient of boron in silicon being nearly equal to 1. Another advantage of using boron as acceptor substance in silicon is the fact that the lifetime of the minority carriers is less strongly reduced, because the alloying process takes place at temperatures considerably lower than those required when using aluminum as doping agent. It is further desirable to use gold as contacting metal for p-doped zones, because gold is also applicable as contacting metal for n-type zones, such as those produced by alloying a gold-antimony foil together with the silicon, and using the same metal for both types of zones affords doing away with the necessity of differently processing the p-side and n-side electrodes to which the respective current leads are to be attached.

The above-described boron-doping method by alloying is also superior to the known diffusion method according to which boron is caused to enter into the silicon by heating the silicon body in the presence of gaseous boron compounds, the advantage of the alloying method being due to the difference in the temperatures required. While the diffusion method operates with temperatures from 900 to 1300° C. which greatly reduce the lifetime of the minority carriers, temperatures between 400 and 500° C. are sufficient for the alloying method.

It is an object of our invention to improve the boron-alloying method toward considerably better reliability and reproducibility of optimum properties of the silicon, without forgoing the advantages of the alloying method.

According to our invention, we operate on the above-described principle of producing a highly doped p-type conductance zone together with an appertaining contact electrode on a monocrystalline semiconductor body of silicon by alloying a metal or metal alloy together with the silicon and adding boron to the silicon alloy. However, we further add to the metal to be alloyed into the silicon body, a slight quantity of at least one further element from the third group of the periodic system. The additional element is preferably indium or gallium or a mixture of both. A preferred method is to melt the boron as well as the further additions together with the gold and to then roll the alloy into a foil. A piece of this foil is subjected to tempering and thereafter alloyed onto a silicon disk.

The gold alloys to be used according to the invention preferably contain boron in an amount of 0.001 to 0.3% and 0.01 to 1.0% gallium or indium, the remainder being gold. Particularly favorable are gold alloys with about 0.1% boron, and about 0.2% gallium or indium.

An example of preparing and applying such an alloy is the following: 20 grams of pure gold, 1 milligram of boron, and 100 milligrams of indium or gallium, all in pulverulent form, are melted together at 1200° C. in vacuum or in a protective gas, for example argon. The resulting alloy is rolled to a foil of 0.05 mm. thickness, for example. The foil is tempered at about 300° C. for at least three hours.

Prior to alloying boron and indium or gallium together with gold, the powdered elements are preferably intimately mixed mechanically with each other, for example by slightly heating the gallium (melting point 29° C.) and rubbing it together with the boron in a rubbing dish. It is essential that the gold does not contain an appreciable amount of n-doping activator substances, such as arsenic or antimony in particular.

The indium or gallium participates only to a slight extent in causing p-type doping which, in the main, is effected by alloying the boron into the silicon. However, the effect of indium or gallium is to greatly promote the wetting and alloying action, thus greatly increasing the reliability with which the method can be performed and controlled.

The gold-boron-indium or gold-boron-gallium foil produced in the above-described manner is thereafter cut to size, placed upon a crystalline silicon body in face-to-face contact therewith, and is then heated, preferably under slight mechanical pressure, to the alloying temperature of the foil. The silicon body may have a thickness of 0.4 mm. and a diameter of 10 mm., the foil of 0.05 mm. thickness having about the same or a slightly smaller diameter. The alloying temperature of 400 to 500° C. is preferably maintained for 5 to 10 minutes under mechanical pressure of about 1 to 2 kg. per cm.$^2$. This alloying method may be performed in the manner and by means of the device as disclosed in the copending application Serial No. 790,877 above mentioned.

We claim:

1. The method of producing a p-type conductance zone and an appertaining gold contact electrode on a monocrystalline semiconductor body of silicon, which comprises heating gold in contact with a surface zone of the silicon to form a bonding alloy and adding about 0.001 to 0.3% boron together with about 0.01% to 1.0% of a substance selected from the group consisting of gallium and indium, the heating being at a temperature below the melting point of silicon.

2. The method of producing a p-type conductance zone and an appertaining contact electrode on a monocrystalline semiconductor body of silicon, which comprises placing a metal foil, consisting preponderantly of gold and containing an addition of about 0.001% to 0.3% boron and about 0.01% to 1.0% of a substance taken from the group consisting of gallium and indium in pressure contact with a surface zone of the silicon body, and heating the assembly to alloying temperature to form an alloyed fusion bond.

3. The method of producing a p-type conductance zone and an appertaining contact electrode on a monocrystalline semiconductor body of silicon, which comprises heating a foil preformed of an alloy of 0.001 to 0.3% boron and 0.01 to 1.0% of substance selected from the group consisting of gallium and indium, the remainder being gold, the heating being in face-to-face contact with the silicon body to form a silicon-alloy bond.

4. The method of producing a p-type conductance zone and an appertaining contact electrode on a monocrystalline semiconductor body of silicon, which comprises placing a metal foil, consisting of an alloy of gold with about 0.001 to 0.3% boron and about 0.01 to 1.0% of a substance taken from the group consisting of gallium and indium, in pressure contact with a surface zone of the silicon body, and heating the assembly to a temperature of 400 to 500° C. to form an alloyed fusion bond.

5. The method of producing a p-type conductance zone and an appertaining contact electrode on a monocrystalline semiconductor body of silicon, which comprises placing a metal foil, consisting of an alloy of gold with about 0.001 to 0.3% boron and about 0.01 to 1.0% of a substance taken from the group consisting of gallium and indium, in pressure contact with a surface zone of the silicon body, and heating the assembly to alloying temperature to form an alloyed fusion bond, the alloying temperature being below the melting point of silicon.

6. The method of producing a p-type conductance zone and an appertaining contact electrode on a monocrystalline semiconductor body of silicon, which comprises placing a metal foil, consisting of an alloy of gold with about 0.001 to 0.3% boron and about 0.01 to 1.0% of a substance taken from the group consisting of gallium and indium, in pressure contact with a surface zone of the silicon body, and heating the assembly to alloying temperature to form an alloyed fusion bond, the alloying temperature being below the melting point of silicon, the foil being prepared by forming a melt of gold, boron, and said substance, and solidifying and forming a foil therefrom.

7. The method of producing a p-type conductance zone and an appertaining contact electrode on a monocrystalline semiconductor body of silicon, which comprises heating a foil preformed of an alloy of 0.001 to 0.3% boron and 0.01 to 1.0% of a substance selected from the group consisting of gallium and indium, the remainder being gold, the heating being in face-to-face contact with the silicon body, to form a silicon-alloy bond, the alloying temperature being below the melting point of silicon, the foil being prepared by forming a melt of gold, boron, and said substance, and solidifying and forming a foil therefrom.

References Cited in the file of this patent

UNITED STATES PATENTS

| | | |
|---|---|---|
| 2,789,068 | Maserijan | Apr. 16, 1957 |
| 2,791,524 | Ozarow | May 7, 1957 |
| 2,833,678 | Armstrong | May 6, 1958 |
| 2,850,412 | Dawson et al. | Sept. 2, 1958 |
| 2,860,219 | Taft et al. | Nov. 11, 1958 |
| 2,877,147 | Thurmond | Mar. 10, 1959 |
| 2,898,528 | Patalong | Aug. 4, 1959 |
| 2,897,587 | Schnable | Aug. 4, 1959 |
| 3,009,840 | Emeis | Nov. 21, 1961 |